(12) United States Patent　　(10) Patent No.: US 9,395,757 B2
Relf　　(45) Date of Patent: Jul. 19, 2016

(54) AUXILIARY SCREEN MOUNTING SYSTEM

(71) Applicant: Dovetail Technology Ltd., Nottinghamshire (GB)

(72) Inventor: Matthew James Relf, Nottinghamshire (GB)

(73) Assignee: Dovetail Technology Ltd., Nottinghamshire (GB)

( * ) Notice: Subject to any disclaimer, the term of this patent is extended or adjusted under 35 U.S.C. 154(b) by 0 days.

(21) Appl. No.: 14/543,985

(22) Filed: Nov. 18, 2014

(65) Prior Publication Data

US 2015/0138711 A1　　May 21, 2015

(30) Foreign Application Priority Data

Nov. 18, 2013　(GB) .................................. 1320328.6

(51) Int. Cl.
*G06F 1/16*　　(2006.01)
(52) U.S. Cl.
CPC ............ *G06F 1/1647* (2013.01); *G06F 1/1607* (2013.01); *G06F 1/1654* (2013.01)
(58) Field of Classification Search
CPC .............................. G06F 1/1647; G06F 1/1649
USPC ...................................................... 361/679.04
See application file for complete search history.

(56) References Cited

U.S. PATENT DOCUMENTS

| | | | |
|---|---|---|---|
| 5,035,392 A | 7/1991 | Gross et al. | |
| 5,082,235 A | 1/1992 | Crowther et al. | |
| 5,125,612 A | 6/1992 | McNeal | |
| 6,290,200 B1 | 9/2001 | Ko | |
| 6,532,146 B1 * | 3/2003 | Duquette | G06F 1/1607 361/679.04 |
| 6,967,632 B1 | 11/2005 | Minami et al. | |
| 7,283,353 B1 * | 10/2007 | Jordan | G06F 1/1601 248/122.1 |
| 7,889,481 B2 | 2/2011 | Mickey et al. | |
| 8,317,146 B2 * | 11/2012 | Jung | G06F 1/1601 248/125.7 |
| 8,488,306 B2 * | 7/2013 | Mickey | F16M 11/06 248/278.1 |
| 2011/0155868 A1 | 6/2011 | Sun et al. | |

OTHER PUBLICATIONS

British Search Report dated Aug. 5, 2014, from the corresponding British Patent Application No. GB1320328.6 filed Nov. 18, 2013.

* cited by examiner

*Primary Examiner* — Anthony Q Edwards

(74) *Attorney, Agent, or Firm* — Young Basile Hanlon & MacFarlane, P.C.

(57) ABSTRACT

An auxiliary screen support system for a computing device has mounting members arranged to be disposed on opposing lateral sides of a primary screen of the computing device in use. A retaining member extends between the mounting members, and is configured to hold the mounting members relative to the opposing lateral sides of the primary screen. At least one mounting member is configured to bear an auxiliary screen such that the auxiliary screen is hung relative to the primary screen in use. One or both mounting members may be formed as a unitary, rigid body and may be configured to hold an auxiliary screen at a fixed obtuse angle relative to a primary screen of the computing device.

19 Claims, 5 Drawing Sheets

AUXILIARY SCREEN MOUNTING SYSTEM

CROSS REFERENCE TO RELATED APPLICATION

The present application claims priority to Great Britain Patent Application No. 1320328.6, filed Nov. 18, 2013, incorporated herein in its entirety.

TECHNICAL FIELD

The present invention relates to the field of computer displays, and more particularly to a support system for mounting an auxiliary screen to a computing device, such as a portable computing device.

BACKGROUND

In the field of computing there exists a general desire for the provision of an auxiliary screen to supplement the functionality of a primary screen of a computing device. In particular, the provision of an auxiliary screen facilitates the performance of a plurality of simultaneous tasks, primarily by allowing different information or user interfaces to be concurrently displayed on each of the primary and auxiliary screens.

Conventional desktop computers may be simply provided with a secondary monitor, which may stand on a common support surface alongside a primary monitor and which can be connected to the computer base via conventional cabling. However, such monitors typically comprise large, freestanding structures, which are unwieldy to transport and require a desk or table of sufficient size for use. Monitor systems such as these are clearly unsuitable for use in conjunction with portable computing devices, which are intended to be used in a more ad-hoc manner.

U.S. Pat. No. 7,889,481 and U.S. Pat. No. 8,488,306 each disclose secondary computing device display systems. However the systems disclosed by U.S. '481 and U.S. '306 are complex clamping mechanisms which are relatively expensive, as well as being time consuming to attach. Furthermore, the mechanical clamping mechanisms of U.S. '481 and U.S. '306 and may be prone to degradation or failure with repeated use and/or transportation over time.

SUMMARY

It is therefore an objective of the present invention to provide an auxiliary screen support system for which one or more of the aforementioned problems is at least partially mitigated.

According to a first aspect of the present invention there is provided an auxiliary screen support system for a portable computing device, the support system comprising; a plurality of mounting members and a retaining member, wherein the retaining member extends between the plurality of mounting members, and at least one mounting member is configured to bear an auxiliary screen in use.

The portable computing device may comprise a primary screen, which may be actuable relative to a base. The primary screen may have a depth that is significantly smaller (e.g. an order of magnitude smaller or more) than its width and/or height dimension. The portable computing device may be a laptop computer or other device of generally clamshell design.

The plurality of mounting members may be arranged to be disposed on opposing lateral sides or edges of the electronic device (e.g. the primary screen) when in use.

The retaining member may be configured to hold the plurality of mounting members relative to the opposing lateral sides of the portable computing device. One or both mounting members may be configured to hold an auxiliary screen at a fixed angle relative to a primary screen. The auxiliary screen viewing angle is adjustable by adjusting the orientation/position of the primary screen. The weight of the auxiliary screen may be borne by the primary screen. Additionally or alternatively, the mounting member(s) may comprise a hinge for adjusting the angle of the auxiliary screen, for example about a single hinge axis.

The plurality of mounting members may have the form of brackets. The brackets may comprise first and second portions. The first and second portions may be angled, eg obliquely angled, relative to one another. The angle between the first and second portions may be in the range of 120-180 degrees. This angle thereby provides a suitable angle for viewing an auxiliary screen, e.g. relative to a primary screen, when it is supported by a mounting member. The first and second portions may be of fixed or adjustable relative angular orientation.

The mounting member, e.g. the first portion thereof, may comprise a formation for receiving the retaining member. The retaining member may or may not be looped around the receiving formation. The receiving member may comprise a slot or other formation for aligning the retaining member relative to the opposing mounting members.

The first portion may comprise a partial enclosure, for example in the form of a hood formation. The partial enclosure may comprise first, second and third walls and may or may not be substantially triangular in plan. The first wall may be a rear wall. The second wall may be a front wall. The third wall may extend between an upper edge of the first and second walls, so as to form a hood formation. The first, second and third walls may be relatively angled so as to define a partially or substantially enclosed volume. The volume may be enclosed on at least three sides. The substantially enclosed volume may have a shape that substantially corresponds to the vertex of a portable computing device.

The first and second walls may be obliquely angled, e.g. at an acute angle, and may define an internal edge or corner. The third wall may be oriented in a plane that is substantially perpendicular to the first and/or second walls. The walls may define a three-dimensional internal corner. The second wall may be shorter than the first wall.

An internal surface of the first portion may be shaped to engage with a primary screen of the portable computing device, for example at its edge or corner. The internal surface may comprise one or more engagement formation, such as a groove, channel or striation to closely fit the primary screen. A plurality of striations may be provided, for example as a linear array, e.g. as a series of steps.

The second, or front, wall may comprise the engagement formation(s). The second wall may be located intermediate, e.g. at an interface between, the first and second portions of the mounting member. The second wall may be angled away from the second portion and may extend inwardly from the first and second portions. The second wall may comprise a substantially curved surface and a stepped surface. The substantially curved surface may substantially face the second portion. The stepped surface may substantially face the first wall.

The second wall may be adapted to engage a vertex of a portable computing device. The spine portion may be adapted to engage the vertices of a variety of portable computing devices, such that the bracket is range-taking for a plurality of different primary screens of varying depth dimension. The height difference between subsequent steps in the stepped surface may correspond to the thickness of a primary screen of differing portable computing devices.

The second portion may take the form of a wing or ear-like formation depending from the first portion. The second portion may comprise a screen mounting formation in the form of a recess or slot. The screen receiving mounting formation may be located at or adjacent the interface between the first and second portions. The screen receiving formation may be located at an upper corner of the second portion. The screen receiving slot may be shaped so as to bear an auxiliary screen under the action of friction and/or gravity in use. The screen receiving slot may be substantially "U-shaped" in form. The screen receiving formation may be tapered. The screen receiving formation may be shaped so as to receive a corresponding projection of an auxiliary screen, or an auxiliary screen case.

The screen receiving formation may have a profiled edge for engagement with a corresponding portion of the auxiliary screen. The edge may be profiled in section and may be an inner edge of a recess. The profiled edge may provide an alignment or keying function and may be curved or tapered in section, for example as a double bevel or bullnose edge.

Each mounting member may be formed of plastic. The first and second portions may be commonly/integrally formed as a single body of material.

The plurality of mounting members may have substantially the same form, but may be reflections of each other. Thus the plurality of mounting members may be used to mount a plurality of auxiliary screens, e.g. on opposing sides of a primary screen.

Alternatively each of the plurality of mounting members may have a different form. A first mounting member may have substantially the form as described above. A second mounting member, or a simple hook-like formation.

The opposing sides of the computing device against which the mounting members are located may be opposing intermediate edges of the computing device.

The retaining member may be adaptable such that the support system may be used for a variety of portable computing devices. The retaining member may comprise a resilient material or tensioning mechanism. The retaining member may be formed of an elastic material. The retaining member may comprise a textile and/or one or more springs. The retaining member may be formed of a rigid material. The retaining member may comprise a sprung loaded rigid connection. The retaining member may comprise an adjustment mechanism, e.g. a length adjustment mechanism, such as a ratchet.

The retaining member may be elongate and may extend across substantially the entirety of the width of a primary screen of a computing device during use.

The retaining member may actively hold apart the plurality of mounting members, e.g. in tension. The tensioning force may be strong enough to hold the plurality of mounting members in position, yet may be weak enough so as not to cause any damage to the primary screen of a computing device in use. The tension in the retaining member may be adjustable.

When in use the auxiliary screen support system may be disposed upon a primary screen of a portable computing device. The support system may be removably applied to a primary screen of a portable computing device. The support system may be configured and/or shaped to hang on a primary screen of a portable computing device, e.g. at least partly under the action of gravity. The partially or substantially enclosed volume of each of the plurality of mounting members may have a shape that allows the support system to hang on a primary screen of a portable computing device, e.g. at its vertices.

The support system, e.g. the plurality of mounting members, may be shaped so as to slide on to the primary screen of a portable computing device. The channels formed in the plurality of mounting members may allow the support system to slide onto the primary screen of a portable computing device. The plurality of mounting members may fit onto the primary screen of a portable computing device with a close fit.

According to a further aspect of the present invention, there is provided an auxiliary screen housing for use in conjunction with the auxiliary screen support system of the first aspect of the present invention.

The screen housing may be integrally formed with an auxiliary screen, for example as a screen casing. Alternatively, the screen housing may be a separate component which may be adapted to receive an auxiliary screen, for example as a removable cover.

The screen housing may comprise a projection arranged to releasably engage with a mounting member of the screen support system. The screen housing may comprise a plurality of projections. The plurality of projections may be located on a rear surface of the screen housing. Each of the plurality of projections may be located towards a corner of the screen housing. There may be a single projection located at a plurality or all corners of the screen housing.

The, or each, projection may be upstanding from a rear surface of the screen housing. The, or each, projection may be integrally formed with the screen housing. Alternatively, the plurality of projections may be attached to the screen housing, for example by adhesive, or by using other conventional attachment means.

The, or each projection may take the form of a lug, foot or pedestal. The cross-section of each of the plurality of projections may not be constant along the length of each of the plurality of projections. Each of the plurality of projections may be tapered along its length. The dimensions or shape of the projection(s) may correspond substantially to that of the screen receiving formation of the mounting member(s).

Each of the plurality of projections may comprise a channel or groove. The channel may be located on a peripheral surface or edge of the projection. The channel may be configured to correspond to the screen receiving formation of the mounting member(s). The channel may extend around substantially the entirety of the peripheral surface of the projection. The width of the channel may correspond to the material thickness (i.e. depth) of the screen receiving formation of the mounting member(s).

An auxiliary screen may be mounted relative to the primary screen of a portable computing device by engagement between the projection and the mounting member. At least one of a plurality of projections may be in a different orientation to another of the plurality of projections. A first projection may be perpendicularly oriented relative to a second projection. Two pairs of such projections may be provided. This may allow the screen housing to be utilised in both portrait and landscape orientations and/or on opposing sides of a primary screen. Thus an array of fixed projections may provide for the different mounting orientations of the auxiliary screen, without requiring complicated actuable parts.

The screen housing may further comprise one or more electronic ports. The electronic port(s) may include, but is not limited to, any combination of the following inputs: USB; MicroUSB; DisplayPort; and HDMI. The plurality of electronic ports may be adapted to provide power to an auxiliary screen. Thus there is no need for batteries, or an external power source, or the like, for the auxiliary support screen, other than the power source for the portable computing device.

The power provided to the screen may be actively or passively controlled. The brightness of the screen may be controlled, e.g. automatically according to the available power. The screen housing may comprise corresponding control circuitry, for example as a PCB within the housing.

DESCRIPTION OF THE DRAWINGS

Practical embodiments of the invention are described in further detail below, with reference to the accompanying drawings, of which.

DETAILED DESCRIPTION OF THE EMBODIMENTS

Figure 1:
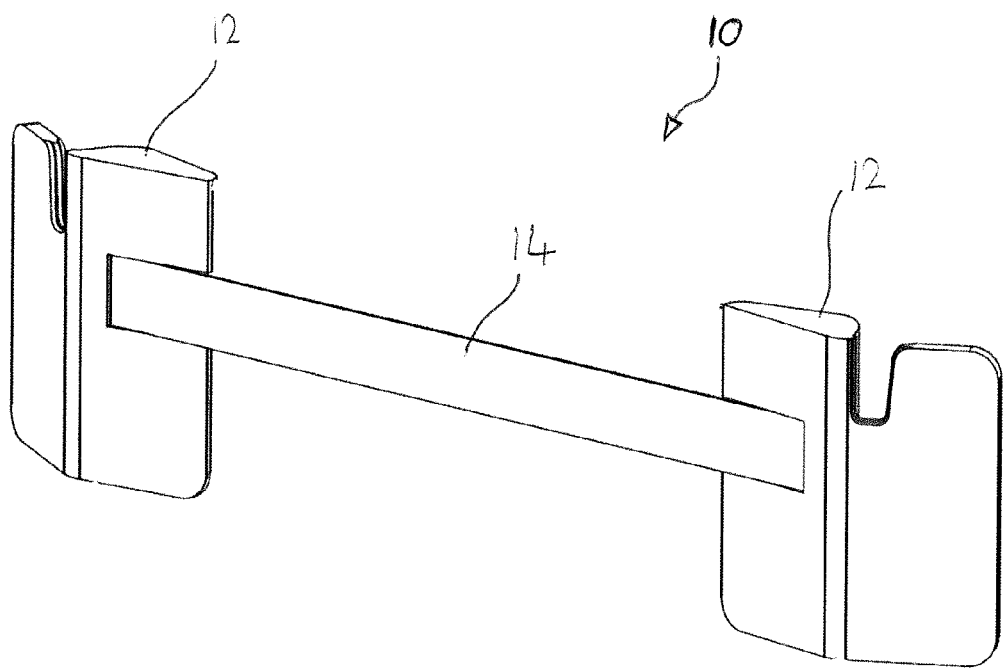
FIG. 1 shows a rear three-dimensional view of an auxiliary screen support mounting system according to the present invention.
Figure 2:
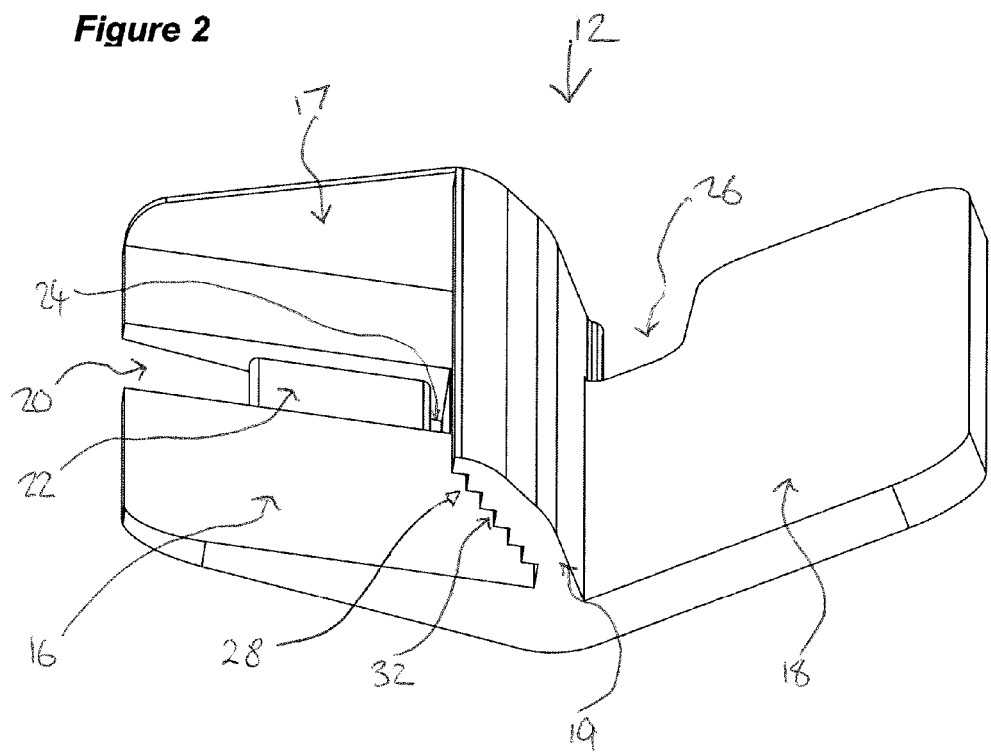
FIG. 2 shows a three-dimensional view from below of a mounting member according to the present invention.
Figure 3:
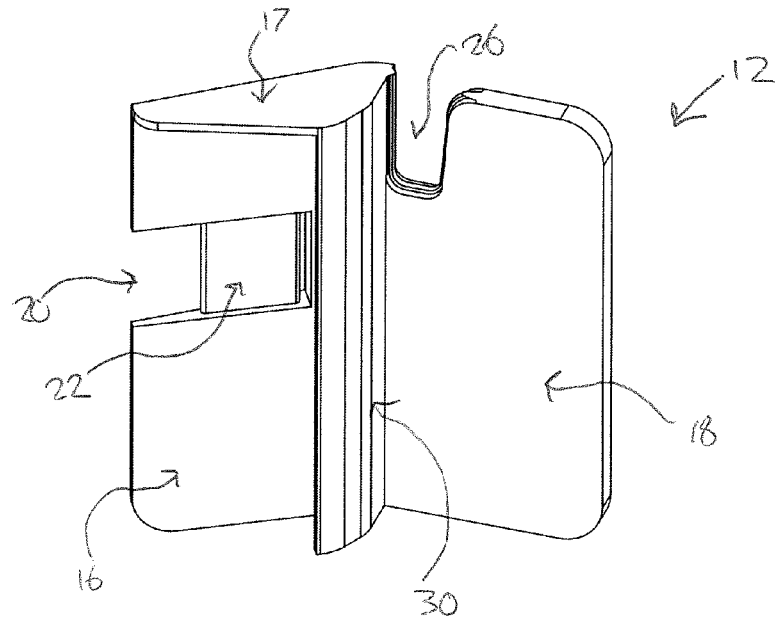
FIG. 3 shows a three-dimensional front view of a mounting member according to the present invention.
Figure 4:
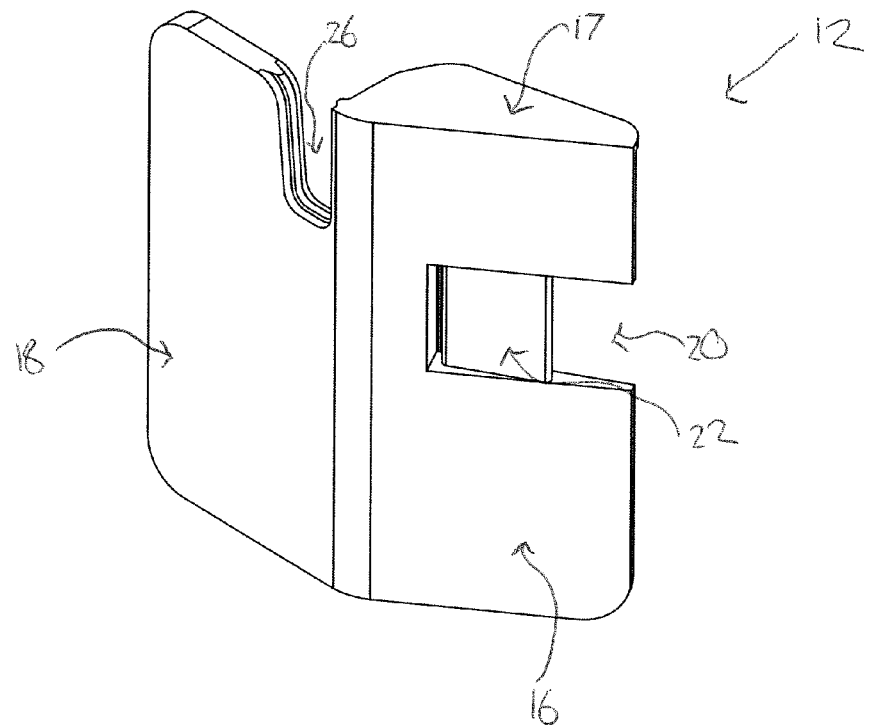
FIG. 4 shows a three-dimensional rear view of a mounting member according to the present invention.
Figure 5:
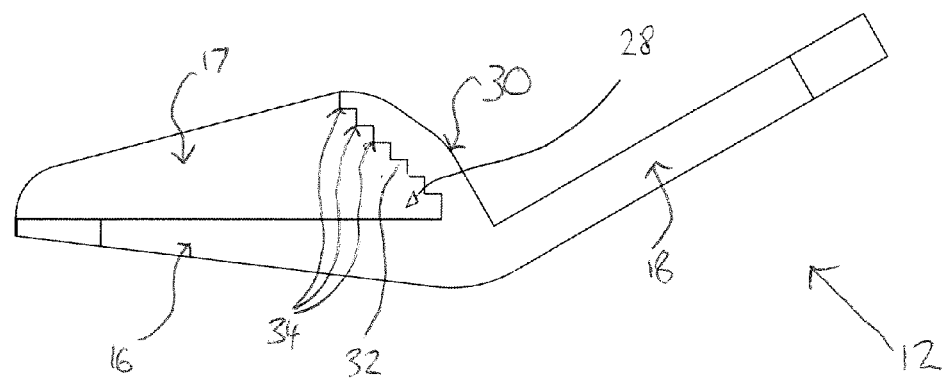
FIG. 5 shows a plan view from below of a mounting member according to the present invention.

With reference to FIG. 1, there is shown an auxiliary screen mounting system, generally designated 10, according to the present invention. The auxiliary screen mounting system 10 comprises a plurality of mounting members 12 and a retaining member 14. The mounting members 12 are spaced apart and the retaining member 14 spans the gap there-between so as to couple the mounting members together.

With reference to FIGS. 2 to 5, there is shown a mounting member 12 according to an example of the present invention. The mounting member 12 comprises first 16 and second 18 portions. The mounting member further comprises a third "hood-like" portion 17, and a fourth "spine-like" portion 19. The mounting member is made of a plastic material, typically by a moulding process or an additive manufacturing process (e.g. 3D printing) such that all of the portions of the mounting member comprise a single body of material bearing the desired shape. Any of the first to fourth portions may be referred to as walls.

The first 16 and second 18 portions are integrally formed, and are obliquely angled, typically at an obtuse angle relative to one another. The internal angle there-between may be greater than 135° or 140° and in this example is approximately 160°. The angle defines an orientation of an auxiliary screen relative to a primary screen in use as will be described in further detail below.

The first portion 16 is substantially rectangular in plan, yet has substantially rounded vertices. The first portion comprises a slot 20 for receiving the retaining member 14. The slot opens at a lateral edge of the first portion (i.e. an edge which faces the opposing mounting member in use) and extends across a portion of the width of the first portion towards its closed end.

The slot 20 is substantially rectangular in form, and is located in an upper region of the first portion 16. The slot 20 extends across a majority of the width of the first portion 16. The width of the slot 20 substantially corresponds to the width of the retaining member 14.

The slot 20 comprises a receiving formation 22. The receiving formation 22 extends across the width of the slot 20 at a location spaced from the end of the slot. The receiving formation 22 is disposed in a substantially towards the closed end of the slot 20 but there is a small gap 24 located between the receiving formation 22 and the closed end of the slot 20. The dimensions of the gap 24 substantially correspond to the width and thickness of the retaining member 14.

In this example the receiving formation 22 is substantially rectangular in form but may otherwise shaped, e.g. as a pin or column, for holding the retaining member 14 relative to the mounting member in use.

The second portion 18 is substantially rectangular in form, yet has substantially rounded vertices. The second portion 18 has substantially the same length and width dimensions as the first portion 20. The second portion 18 comprises a screen receiving formation in the shape of a recess or slot 26. The screen receiving slot 26 is substantially rectangular in form, yet has substantially curved vertices. The screen receiving slot 26 is tapered along its length. The screen receiving slot 26 is dimensioned so as to receive a corresponding projection of a screen housing as will be described below.

The screen receiving slot 26 is located at an upper vertex of the second portion 18, and is disposed next to the interface between the first 16 and second 18 portions. The height of the screen receiving slot 26 extends less than half, typically approximately a quarter or less of the height of the second portion 18. The width of the screen receiving slot 26 extends for less than half, e.g. no more than a third, of the width of the second portion 18.

The third portion 17 is substantially triangular in form, yet has substantially rounded vertices. The third portion 17 is integrally formed with the first portion 16. The third portion 17 is disposed substantially perpendicularly to the first portion 16, and extends from an upper edge of the first portion 16 towards the interior of the angle formed between the first 16 and second 18 portions. The third portion thus defines a ceiling or hood formation over the internal space formed between the first 16 and fourth 19 portions.

The fourth portion 19 is substantially rectangular in form, yet is curved along its width. The fourth portion 19 is integrally formed with each of the first 16, second 18, and third 17 portions and extends from the interface between the first 16 and second 18 portions towards the interior of the angle formed between the first 16 and second 18 portions. The fourth portion 19 is disposed substantially perpendicularly to the third portion 17, and an upper edge of the fourth portion 19 adjoins a corresponding edge of the third portion 13. Thus the first 16, third 17, and fourth 19, portions bound a partially enclosed volume 28 in the manner of a bracket. The partially enclosed volume 28 has substantially the form of a triangular prism, and is thus able to fit over the vertex of a primary screen of a portable computing device.

The fourth portion 19 comprises an outer surface 30 and an inner surface 32. The outer surface 30 is smooth and curved in nature. The outer surface 30 is substantially perpendicular to the second portion 18 at its inner end. The shape of the outer surface helps with alignment of an auxiliary screen in use. The inner surface 32 comprises a plurality of undulations or ridges 34. The ridges are straight edged (i.e. angular) and, in this example, generally triangular in form. The inner surface 32 thus resembles a series of steps when viewed in the orientation shown in FIG. 5. Each of the "steps" defines a channel of a different width (i.e. having a different spacing from the opposing inner surface of the first portion 16. Thus, when in use the mounting member 12 has the potential to fit over to a wide variety of primary screens of portable computing devices, where the primary screens are of different widths.

The two mounting members 12 shown in FIG. 1 are mirror images of each other in a vertical plane.

The retaining member 14 is substantially rectangular in form, and is elongate. The retaining member 14 comprises loops, which are disposed at opposing ends of the retaining member 14. The retaining member 14 in this example is made from a flexible and/or elastic material, e.g. a textile material. The loops in the retaining member pass about the respective receiving formations 22 in the mounting members such that the opposing ends of the retaining member 14 are secured to the spaced mounting members. The retaining member acts as a tether or strap between the mounting members. Thus the mounting members are loosely held by the retaining member in a manner that allows relative movement between the mounting members prior to positioning on a screen in use.

One or more buckles may be provided to allow adjustment of the loop(s) and/or the length of the retaining member as necessary.

Figure 6:
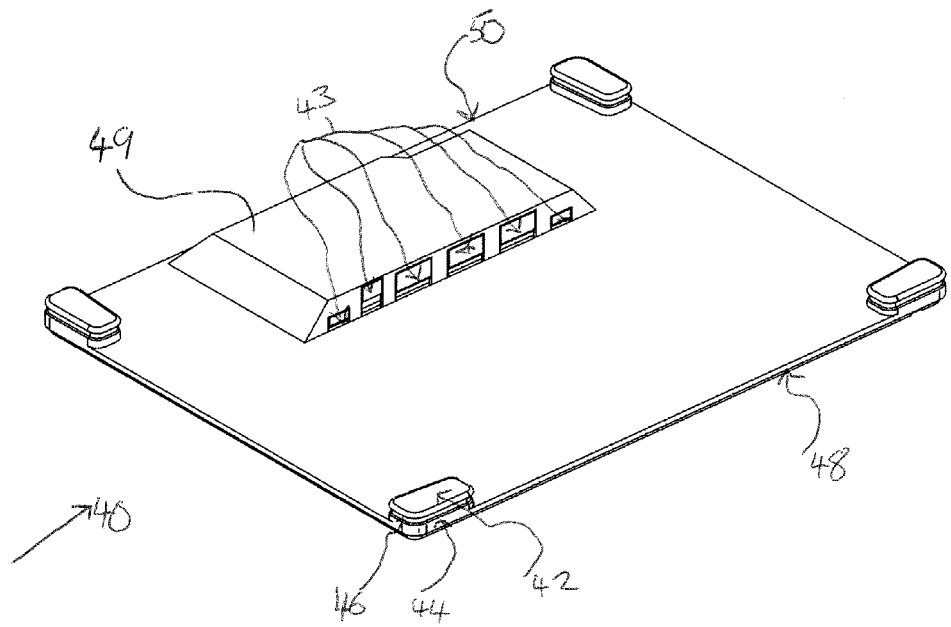
FIG. 6 shows a three dimensional view of a rear surface of a screen housing according to the present invention.
Figure 7:
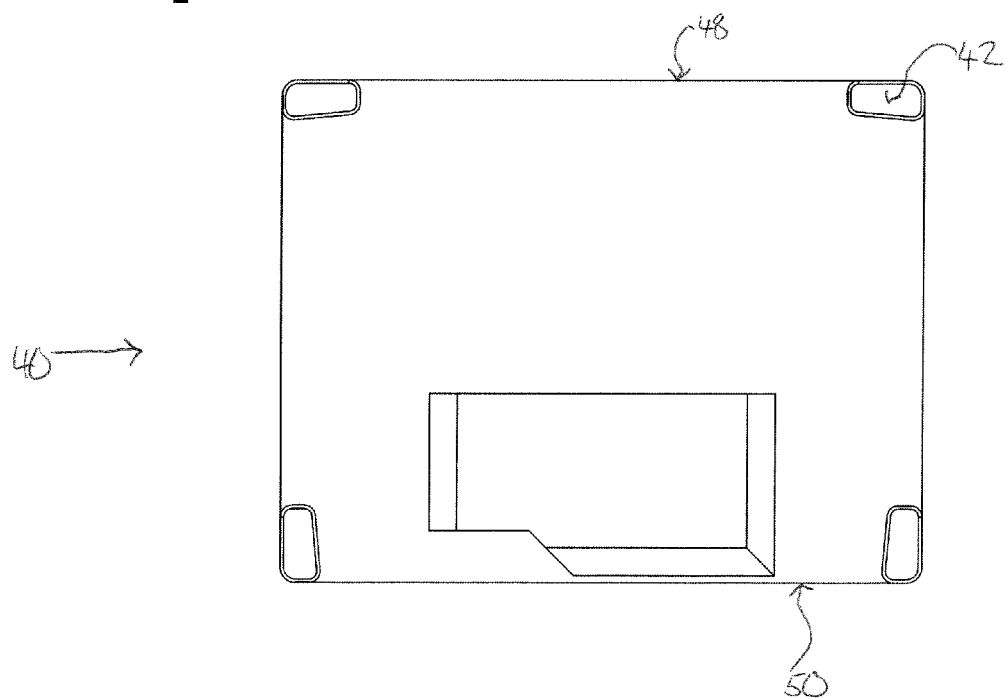
FIG. 7 shows a plan view of the rear of a screen housing according to the present invention.

With reference to FIGS. 6 and 7, there is shown a screen housing, generally designated 40, according to the present invention. The screen housing 40 is substantially rectangular in form, and comprises a plurality of upstanding projections 42, and a plurality of electronic inlet ports 43. The screen housing in this example forms a backing or casing for the display screen and may thus comprise an integral unit therewith. In other examples, the screen housing could be releasably attached to a screen unit, for example as a cover member.

The plurality of upstanding projections 42 are integrally formed with the screen housing 40, and are disposed such that there is a single projection 42 at each vertex of the screen housing 40.

Each of the plurality of projections 42 are substantially rectangular in form, yet have rounded vertices. Each of the plurality of projections 42 are tapered towards one end. Each of the plurality of projections 42 comprises a peripheral surface 44. Each peripheral surface 44 comprises a channel 46. Each channel 46 is linear in form, and each channel 46 extends around substantially the entirety of the peripheral surface 44, although in other embodiments the channel may extend along only a pair opposing sides thereof. The width of each channel 46 is substantially the same as the depth of the screen receiving slot 26. Thus at least two of the plurality of projections 42 of the screen housing 40 is capable of being received by each screen receiving slot 26 of the auxiliary screen mounting system 10. This arrangement helps to align the projection 42 in the slot 26 in a predetermined orientation. In one example of the invention, the projections may be left or right-handed such that only two of the projections can be received in each of the left or right-hand slots 26.

The screen housing 40 comprises opposing first (e.g. upper) 48 and a second (e.g. lower) 50 edges. The plurality of projections 42 disposed upon the first edge 48 of the screen housing 40 are oriented substantially parallel to the edges 48, 50, whereas the plurality of projections 42 disposed upon the second edge 50 of the screen housing 40 are oriented substantially perpendicularly thereto. This arrangement of pairs of projections in perpendicular orientations is particularly beneficial in that the screen housing 40 may be oriented in either a portrait or a landscape view, when the screen housing 40 is received by the auxiliary screen mounting system 10 on either side thereof.

The plurality of electronic inlet ports 43 may be any, or any combination of, USB, MicroUSB, DisplayPort, HDMI, ports, or the like. The plurality of ports 43 are provided in an electronics housing portion 49 of the housing 40. The electronics housing portion 49 comprises the circuitry for managing the power supplied to the auxiliary screen. A cable (not shown) can be connected between a port 43 on the housing and a corresponding port on the electronic device to which the auxiliary screen is to be mounted in use. The circuitry may comprise a controller and may automatically adjust the brightness of the auxiliary screen based upon the available power supplied by ports 43.

By varying the connection of the plurality of electronic inlet ports 43 to a portable computing device, a user can vary the amount of power supplied to an auxiliary screen, and thereby adjust the brightness of the auxiliary screen. For example, if a single USB connection does not supply sufficient power to achieve maximum brightness of the auxiliary screen, a further connection may be established using a second cable connection. However it is envisaged in various examples of the invention that a single cable connection will facilitate the maximum power requirements of the auxiliary screen.

It is envisaged that an auxiliary screen that is as simple and cost-effective as possible may be beneficial to the end user and accordingly that a simple brightness adjustment algorithm (based on the available power) may be implemented. However in other examples of the invention the screen housing 40 may further comprises one or more control buttons. The button(s) may be used to actively control the brightness of the auxiliary screen. Additionally or alternatively the controller may control the screen brightness in accidence with ambient light levels and/or the brightness of the primary screen.

Figure 8:
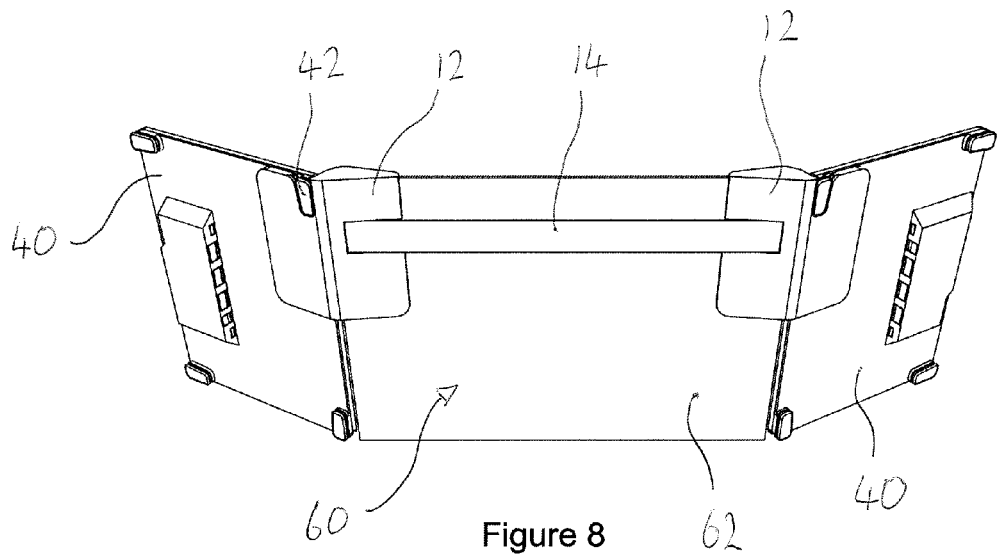
FIG. 8 shows a rear three-dimensional view of an auxiliary screen support mounting system according to the present invention in use with a portable computing device.

With reference to FIG. 8, there is shown an auxiliary screen mounting system 10 and screen housing 40 according to the present invention, in use with a portable computing device 60. The portable computing device 60 shown here is a laptop, yet use with other portable computing devices is also envisaged. For example, the mounting system could be applied to a tablet computer, particularly if the tablet could be adequately supported to a support surface in use, e.g. by a stand or similar support. Whilst the mounting system has been tailored for portable computing devices, it could also be used for desktop PCs, provided the primary display screen has a depth dimensions suitable to accommodate the hanging brackets of the invention.

The portable computing device 60 comprises an upstanding, self-supporting, primary screen 62. When in use, the plurality of mounting members 12 are pulled apart by a user, such that the distance between the plurality of mounting members 12 is sufficient to accommodate a major dimension (e.g. the width) of the primary screen 62 of the portable computing device 60.

The partially enclosed volumes 28 of each of the plurality of mounting members 12 are located over the upper vertices of the primary screen 62, and the mounting members 12 are positioned such that the primary screen 62 is received within a channel defined by the plurality of triangular projections 34 of the inner surface 32 of the fourth portion 19. The stepped channels thus define a best fit for the primary screen, whereby the mounting members can slide onto a border of the primary screen. The primary screen 62 is received within a channel with a close fit, but without any latching or engagement action such that the mounting system is mechanically simple and cost effective.

The opposing mounting members 12 are held laterally upon the primary screen 62 by the tension provided by the retaining member 14, and the auxiliary screen mounting system 10 is held vertically upon the primary screen 62 by abutment between the upper wall 17 of mounting members 12 with the upper edge of primary screen 62.

The tension in this embodiment is provided by the elasticity of the retaining member 14, i.e. wherein the undeformed length of the retaining member is shorter than primary screen width such that the retaining member is elongated/tensioned by donning the mounting members on the opposing sides of the screen. In other examples of the invention, the retaining member may comprise a buckle or other tightening arrangement to allow adjustment of the length of the retaining member to hold the mounting members against opposing portions of the primary screen. In one example, the retaining member could comprise two opposing members, e.g. arm members, which could be rigid, and a length adjustment mechanism therebetween, such as a rack-and-pinion type arrangement, a spring connection in the force path between the two arms, or similar. In any examples, it is desirable simply that the retaining member is adjustable in length and/or tension between the mounting members. This can allow the system to be applied to a wide variety of screen dimensions. However in other embodiments it is possible that the retaining member could be of a rigid, fixed construction in order to be tailored to a particular size (e.g. a particular model) of primary screen. In such an arrangement, the mounting members and the retaining member could be integrally formed, e.g. as a hood or partial jacket about the primary screen.

A projection 42 of a screen housing 40 is located within the screen receiving slot 26 of the second portion 18 of the mounting member 12, such that the screen housing 40 is held in a desired orientation by the engagement of the screen housing 40 with the auxiliary screen support system 10. The plurality of electronic inlet ports 43 are then utilised to connect the screen housing 40 to the portable computing device 60, thereby supplying both data and power to the screen held within the screen housing 40, and allowing the user to utilise an auxiliary screen for the portable computing device 60.

Figure 9:
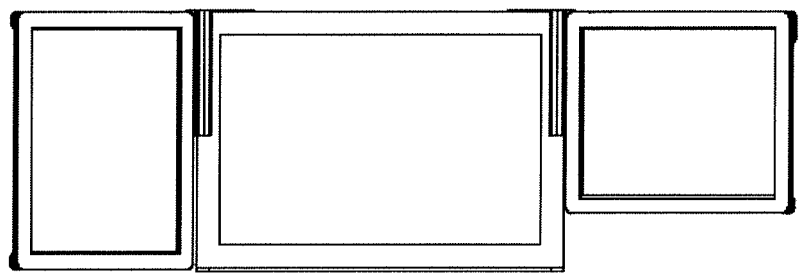
FIG. 9 shows a front view of an auxiliary support system in an alternative usage configuration.

It is notable that the engagement between the projections 42 and the receiving formation 26 on the mounting member is of fixed orientation with respect to the primary screen. Thus the adjustment/tilting of the orientation of the primary screen will cause a corresponding adjustment to the auxiliary screens. A user may thus mount one or two auxiliary screens to the primary screen in either portrait or landscape orientations as shown in FIG. 9, and may thus extend the available display area of the primary screen simply but effectively to suit desirous display requirements.

In any example of the invention, the slot/recess on the mounting members and the projection on the auxiliary screen could be swapped whilst still achieving the desired function of the invention. For example the mounting member could have an upstanding projection of fixed orientation and the screen could bear a number of recesses (e.g. at different relative orientations) to allow the screen to be engaged with the mounting member projection.

In further developments of the concept, it is envisaged that the single-bodied mounting member could be formed of two discrete, rather than unitary, portions, wherein the first and second portions could be connected by a simple hinge, for example at the interface between the first and second portions described above. The simple hinge may have a single degree of freedom, e.g. for rotation about a pivot axis that may be aligned with the interface between the first and second portions. Thus, the auxiliary screen may be fixed for adjustment with the primary screen about a horizontal axis but may be adjustable relative to the primary screen about an upright screen axis.

What is claimed is:

1. An auxiliary screen support system for a computing device, the support system comprising:
    a plurality of mounting members arranged to be disposed on opposing lateral sides of the computing device in use; and
    a retaining member, wherein:
        the retaining member extends between the plurality of mounting members, and is configured to hold the plurality of mounting members relative to the opposing lateral sides of the computing device,
        at least one mounting member is configured to bear an auxiliary screen such that the auxiliary screen is hung relative to the computing device in use, and
        the retaining member is length adjustable to hold the plurality of mounting members relative to the opposing lateral sides of the portable computing device by resisting separation thereof.

2. The system according to claim 1, wherein at least one of the plurality of mounting members is configured to located about a corner of the electronic device.

3. The system according to claim 1 wherein one or both mounting members are configured to hold an auxiliary screen at a predetermined, fixed obtuse angle relative to a primary screen of the portable computing device.

4. The system according to claim 1 wherein one or both mounting members take the form of a bracket having a first portion for engagement with the portable computing device and a second portion depending from the first portion for bearing the auxiliary screen.

5. The system according to claim 4, wherein the bracket comprises a unitary body of material shaped to define the first and second portions.

6. The system according to claim 4, wherein the first portion is shaped to define a partial enclosure which is enclosed on three sides thereof.

7. The system according to claim 6, wherein the first portion comprises a rear wall, a front wall and an upper wall, the upper wall being oriented in a plane that is substantially perpendicular to the front and/or rear walls.

8. The system according to claim 6, wherein a front wall and a rear wall are obliquely angled and at least one of said walls comprises a plurality of engagement formation on its internal side so as to define a series of channels offering different fitment depths.

9. The system according to claim 6, wherein the front or rear wall has a curved outer surface, which slopes away from the second portion.

10. The system according to claim 4, wherein the second portion takes the form of an ear-like formation depending from the first portion.

11. The system according to claim 4, wherein the second portion comprises a screen mounting formation in the form of a recess or projection for engagement with a corresponding projection or recess on an auxiliary screen.

12. The system according to claim 11, wherein the recess and projection have a profiled edge for maintaining a fixed relative orientation of the projection in the recess.

13. The system according to claim 1 wherein each mounting member comprises a pillar formation for receiving the retaining member and the retaining member is looped around the receiving formation.

14. The system according to claim 1 wherein the retaining member comprises an elastic and/or textile material.

15. The system according to claim 1, wherein the mounting members are loosely and/or releasably mounted on a primary screen portion of the portable computing device in use.

16. The system according to claim 1, further comprising an auxiliary screen having a screen housing having an engagement formation for mounting the auxiliary screen on the mounting member with a fixed angular orientation.

17. The system according to claim 16 wherein the housing comprises a plurality of engagement formations at different angular orientations.

18. The system according to claim 16, wherein the engagement formation comprises a pedestal on the rear surface of the auxiliary screen housing.

19. The system according to claim 16, wherein the engagement formation is tapered.

* * * * *